United States Patent
Cho

(10) Patent No.: US 6,976,402 B2
(45) Date of Patent: Dec. 20, 2005

(54) PARKING BRAKE LEVER

(75) Inventor: Kyung Hee Cho, Taegu (KR)

(73) Assignee: Kyung Chang Industrial Corporation, Taegu (KR)

( * ) Notice: Subject to any disclaimer, the term of this patent is extended or adjusted under 35 U.S.C. 154(b) by 176 days.

(21) Appl. No.: 10/393,216

(22) Filed: Mar. 19, 2003

(65) Prior Publication Data

US 2004/0089094 A1 May 13, 2004

(30) Foreign Application Priority Data

Nov. 8, 2002 (KR) ................................ 10-2002-0069001

(51) Int. Cl.[7] ................................................ G05G 1/04
(52) U.S. Cl. ................................................ 74/535
(58) Field of Search ........................ 74/469, 473.3, 74/490.1, 490.14, 491, 500.5, 501.5 R, 538, 535, 533, 529, 523, 527

(56) References Cited

U.S. PATENT DOCUMENTS

| | | | | |
|---|---|---|---|---|
| 4,138,905 A | * | 2/1979 | Konishi | 74/577 R |
| 4,311,060 A | * | 1/1982 | Kawaguchi et al. | 74/142 |
| 5,272,935 A | * | 12/1993 | Heinemann et al. | 74/523 |
| 5,448,928 A | * | 9/1995 | Harger | 74/523 |
| 5,878,626 A | * | 3/1999 | Gutierrez | 74/500.5 |
| 5,950,496 A | * | 9/1999 | Rampp | 74/538 |
| 6,282,980 B1 | * | 9/2001 | Sykes | 74/528 |

FOREIGN PATENT DOCUMENTS

KR 20-261194 3/2003

* cited by examiner

Primary Examiner—Chong H. Kim
(74) Attorney, Agent, or Firm—Morgan Lewis & Bockius LLP

(57) ABSTRACT

The present invention relates to a parking brake lever that is operated by a hand. The parking brake lever has a supporting member fixed to a vehicle frame and which is provided with ratchet portion, and an oscillating member, which oscillates with respect to the supporting member between braking position and releasing position. A push button is provided in one end of the oscillating member. A pawl and a connecting member are operatively interposed between the push button and ratchet portion. The connecting member includes a flexible cable. According to the present invention, even if the push button is inadvertently pressed, the parking brake does not release unless the oscillating member is pulled upwardly. Thus, accident probability caused from inadvertent release of a parking brake is reduced.

6 Claims, 6 Drawing Sheets

PARKING BRAKE LEVER

FIELD OF THE INVENTION

The present invention relates to a parking brake lever of a motor vehicle. More particularly, the present invention relates to a parking brake lever that is operated by hand.

BACKGROUND OF THE INVENTION

A motor vehicle is provided with a foot brake that is actuated by foot and a lever actuated parking brake that restricts the rear wheels of the vehicle when it is operated by hand. Alternatively, a parking brake that is actuated by foot is widely provided in some luxury cars.

Conventional parking brake levers typically have a release button at the end. However, the conventional parking brake lever has a problem in that the braking condition of a vehicle may be released immediately and unintentionally if the push button is inadvertently pressed, potentially causing an accident.

Korean Registered Utility Model No. 20-261194 discloses a technique that attempts to resolve this problem. In the proposed structure, a pawl forms part of a ratchet mechanism for locking the lever. A groove is provided in the pawl and a buffering spring is provided in the linkage between the button and pawl. The buffering spring is intended to buffer the force that is transmitted from push button to alleviate unintended release. However, repeatedly pressing the push button causes fatigue of the buffering spring, thereby fracturing the buffering spring.

SUMMARY OF THE INVENTION

A parking brake lever according to one embodiment of the invention comprises a supporting member which is fixed to a vehicle frame and which is provided with a ratchet portion. An oscillating member oscillates with respect to the supporting member between braking position and releasing position. A push button is provided in one end of the oscillating member. A pawl and a connecting member form an operative linkage between the push button and ratchet portion. The pawl is mounted to oscillate with respect to the oscillating member. Further, the pawl engages with the ratchet portion so as to prevent the oscillating member from oscillating to the released position while the oscillating member is in the braked position. The connecting member preferably extends between the push button and the pawl, thereby converting the pressing force of the push button into the rotating force of the pawl. At least a portion of the connecting member comprises a flexible cable and the rest a rod.

In a preferred embodiment, the flexible cable is configured and dimensioned, and the material selected, such that in the braked position forces applied to the push button are absorbed in the flexible cable and not transmitted to disengage the pawl. The rod, which is substantially rigid, may be used in the portion except the flexible cable, thereby smoothly transmitting the pressing force of the push button to the pawl so as to rotate the pawl. A plurality of the flexible cables can be provided in the parking brake lever.

The oscillating member may include a protrusion which protrudes within the member. Further, the parking brake lever may further comprise a resilient member wherein one end is fixed to the push button and the other end is engaged with the protrusion. The resilient member, for example, a spring, acts to return the push button to the default position.

In a further preferred embodiment of the invention, a parking brake lever comprises an oscillating member and a locking and releasing mechanism. The oscillating member actuates the braking system and is moveable between a released position, a braked position and a releasable position. The locking and releasing mechanism cooperates with the oscillating member such that the oscillating member may be locked in the braked position and released after movement to the releasable position. The mechanism includes a deflectable element configured and dimensioned to absorb forces applied to the mechanism in the braked position thereby preventing release directly from the braked position.

The locking and releasing mechanism preferably comprises a number of components to form a linkage and ratchet. A ratchet portion is adapted to be secured to a frame of the vehicle. A pawl is pivotably mounted on the oscillating member and engageable with the ratchet portion to lock the oscillating member in the braked position. A release member is mounted on the oscillating member in a driver accessible location. The linkage operatively connects the release member and the pawl for transmitting a releasing force from the release member to the pawl. The linkage includes the deflectable element. Preferably, the release member comprises a push button disposed at an end of the oscillating member.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
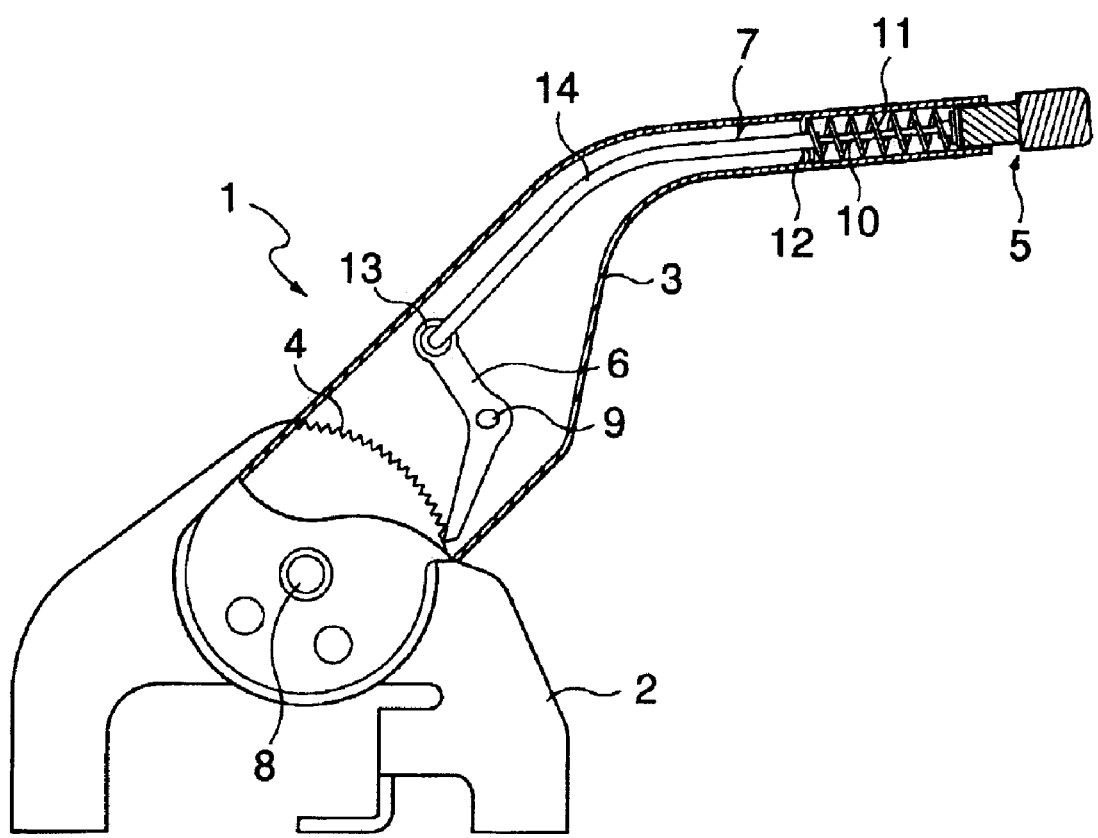
FIG. 1 shows an internal construction of a parking brake lever according to the present invention when the parking brake is not applied.

As shown in FIG. 1, a parking brake lever 1 according to an embodiment of the present invention comprises generally an oscillating member 3 and a push button 5 cooperating with an internal locking and releasing mechanism. A supporting member 2 is fixed to a vehicle frame (not shown).

Oscillating member 3 oscillates between a braking position and a releasing position, centering around a first axis 8 which is axially supported on supporting member 2. The push button is provided in one end of oscillating member 3, cooperating with a pawl 6, and a connecting member 7 of the locking and releasing mechanism. The locking and releasing mechanism also includes ratchet portion 4 provided on supporting member 2. In the released condition, pawl 6 is not engaged with ratchet portion 4 as shown in FIG. 1.

Figure 2:
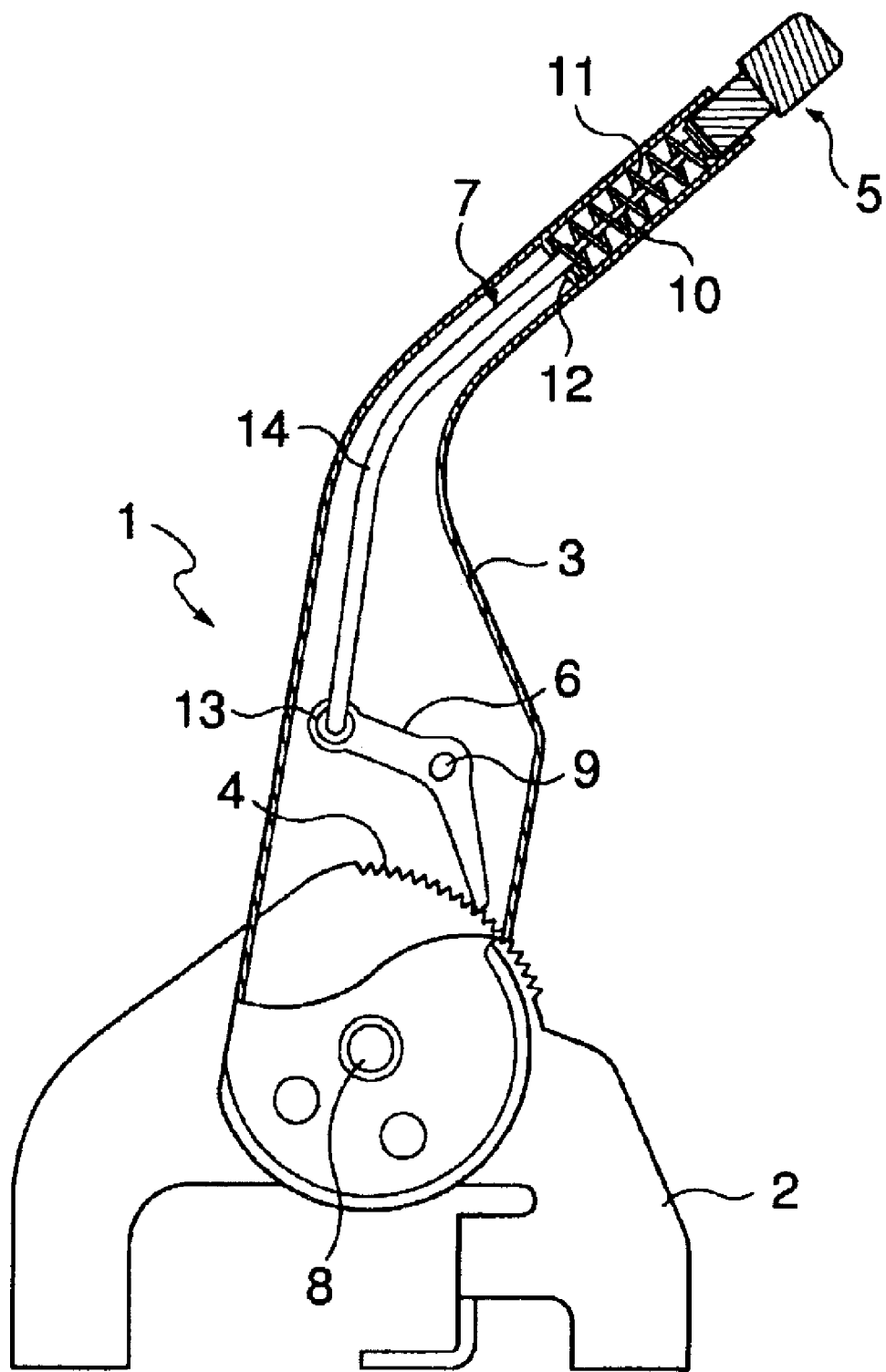
FIG. 2 shows an internal construction of the parking brake lever according to the present invention when the parking brake is applied.

Pawl 6 is rotatable with respect to oscillating member 3, centering on axis 9, and is axially supported on oscillating member 3. Pawl 6 engages with ratchet portion 4 of supporting member 2 when oscillating member 3 is in the braked position (FIG. 2). Thus, the oscillating member is prevented from oscillating to released position. When oscillating member 3 is upwardly pulled as shown in FIG. 2 and when pawl 6 engages with ratchet portion 4, thereby preventing rotation of oscillating member 3, a brake cable (not shown) connected to oscillating member 3 is pulled. Such a braking force is uniformly distributed to both rear wheels via an equalizer (not shown), thereby braking the vehicle. Such a system for distributing braking force is understood in the art, and thus is not described in detail in this specification.

Connecting member 7 extends between pawl 6 and push button 5. Pressing push button 5 rotates pawl 6 with respect to oscillating member 3 to release the engagement between pawl 6 and ratchet portion 4. One end of connecting member 7 is fixed to push button 5 and the other end is fixed to pawl 6 by a pin 13 so that pawl 6 can oscillate with respect to connecting member 7, centering around pin 13.

As shown in FIG. 1, connecting member 7 preferably comprises flexible cable 10 and rod 14. Flexible cable 10 is provided adjacent to push button 5. As used herein, the term "flexible" refers to a characteristic of a material that transmits the pressing force of the push button to the pawl so as to rotate the pawl when the oscillating member is slightly pulled upwardly from its braking position and that cannot transmit the pressing force of the push button to the pawl when the oscillating member is not pulled upwardly from the braking position. As a non-limiting example the flexible cable may have a diameter between about 1.0 mm and 3.0 mm, and a length between about 10 mm and 50 mm. More preferably the diameter is about 1.5 mm and the length about 30 mm. In preferred embodiments, cables made in accordance with SAE1026–SAE1095 using 30455 can be used in the flexible cable. Rod 14 is preferably substantially rigid, for example in a form of a solid pipe. Flexible cable 10 can be fitted to rod 14, or can be fixed to the rod by means of adhesives.

A resilient member such as a coil spring 11 may be provided for returning pressed push button 5 to the default position when pressing force of push button 5 is removed. One end of coil spring 11 may be fixed to push button 5 and the other end engaged with protrusion 12 that is provided within oscillating member 3.

Figure 3A:
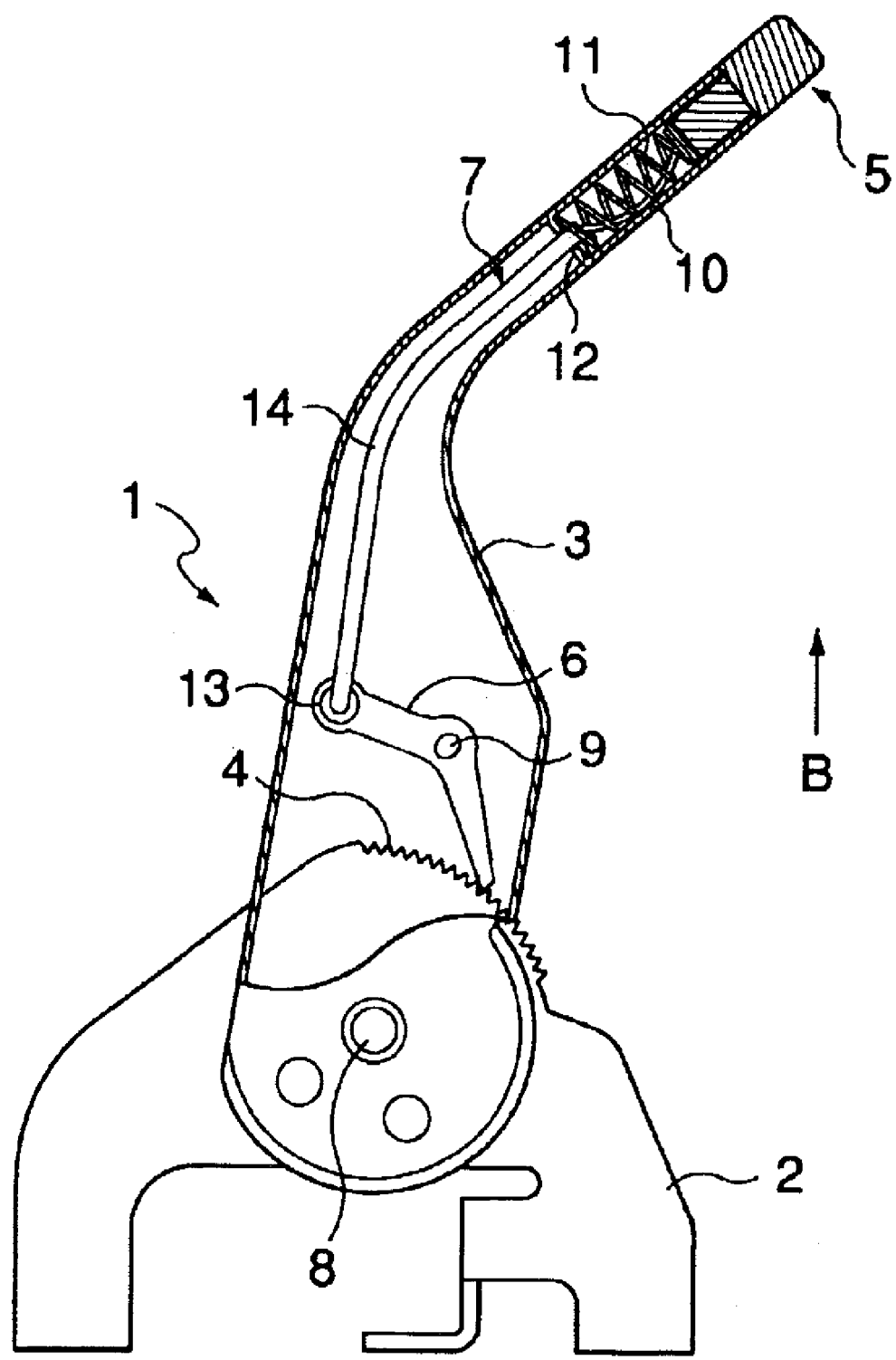
FIG. 3a shows an internal construction of the parking brake lever according to the present invention when a push button is pressed.

In FIG. 3a, push button 5 has been pressed with the oscillating member in a braked condition. In this state, a force is applied downwardly and reaction force in the direction of arrow "B" is generated in pawl 6 engaged with ratchet portion 4. Flexible cable 10 is configured and dimensioned and the material selected such that the force transmittable through the flexible cable cannot exceed reaction force, which must be overcome to release the pawl, resulting in flexible cable 10 taking a curved configuration as shown when such force is applied. As a result, force applied to push button 5 when oscillating member 3 is in the braked position is not transmitted to an extent sufficient to release engagement between pawl 6 and ratchet portion 4. Thus, even if push button 5 of a parking brake lever 1 is pressed inadvertently, the parking brake is not released.

Figure 3B:
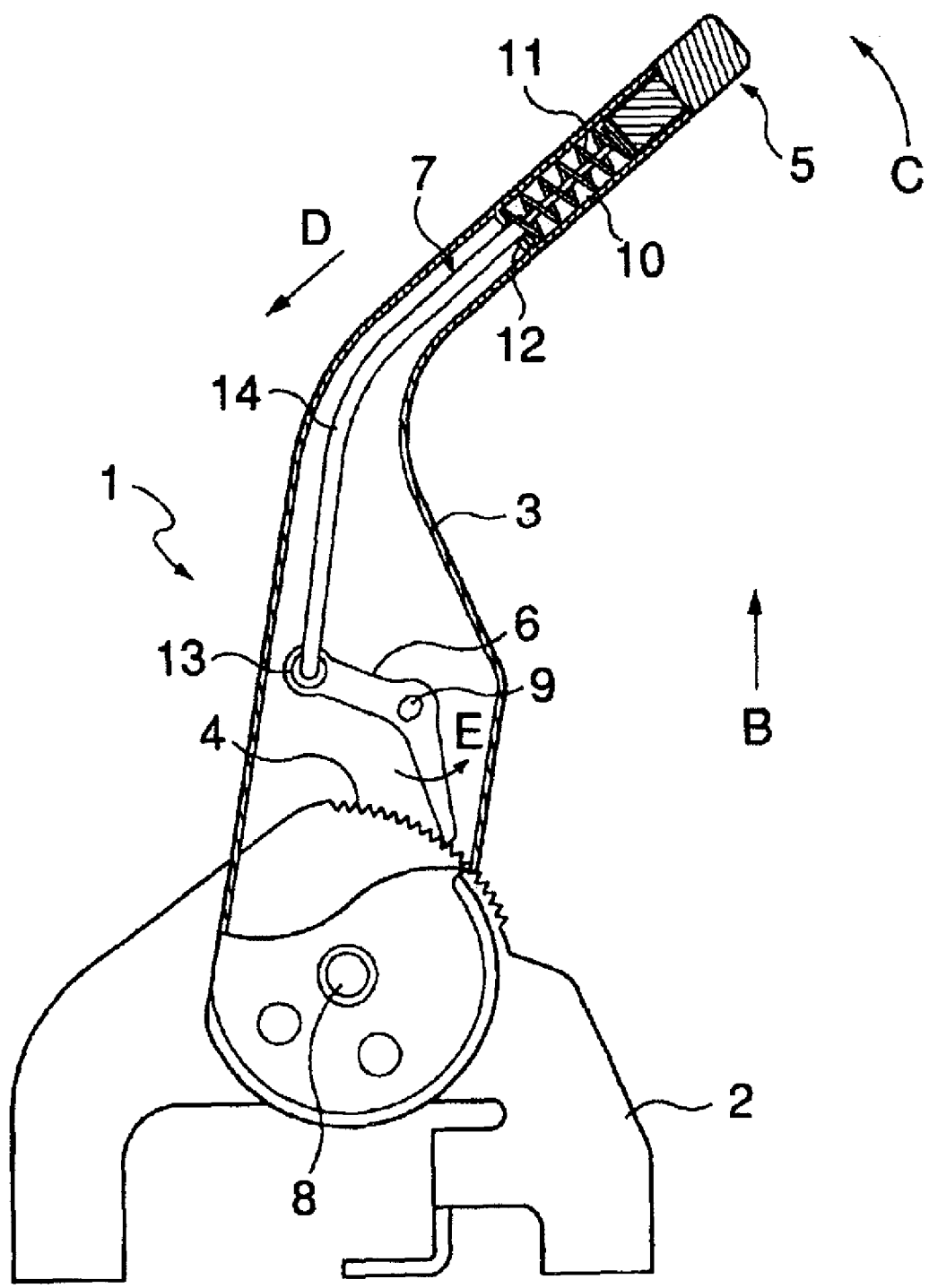
FIG. 3b shows an internal construction of the parking brake lever according to the present invention when the parking brake is being released.

FIG. 3b shows parking brake lever 1 according to an embodiment of the present invention is in a releasable condition. As described in the above, parking brake lever 1 according to the present invention is not immediately converted to a releasable condition from the braked condition only by pressing push button 5. In order to release the engagement between pawl 6 and ratchet portion 4, the reaction force applied in the direction of arrow "B" should be removed. Only when the reaction force is removed is the pressing force to push button 5 transmitted to pawl 6 via connecting member 7, thereby rotating the pawl 6 with respect to oscillating member 3.

In order to remove the reaction force, an operator only has to slightly pull oscillating member 3 upwardly in the direction of arrow "C" as shown in FIG. 3b. When the oscillating member is pulled upwardly as shown, the reaction force is removed temporarily. At this time, pressing push button 5 pushes connecting member 7 in the direction of arrow "D," thereby transmitting a force to pawl 6 so as to rotate the pawl in the direction of arrow "E." Rotation of pawl 6 in the direction of arrow "E" releases the engagement with ratchet portion 4. Therefore, oscillating member 3 can be oscillated into the releasable position.

Figure 4:
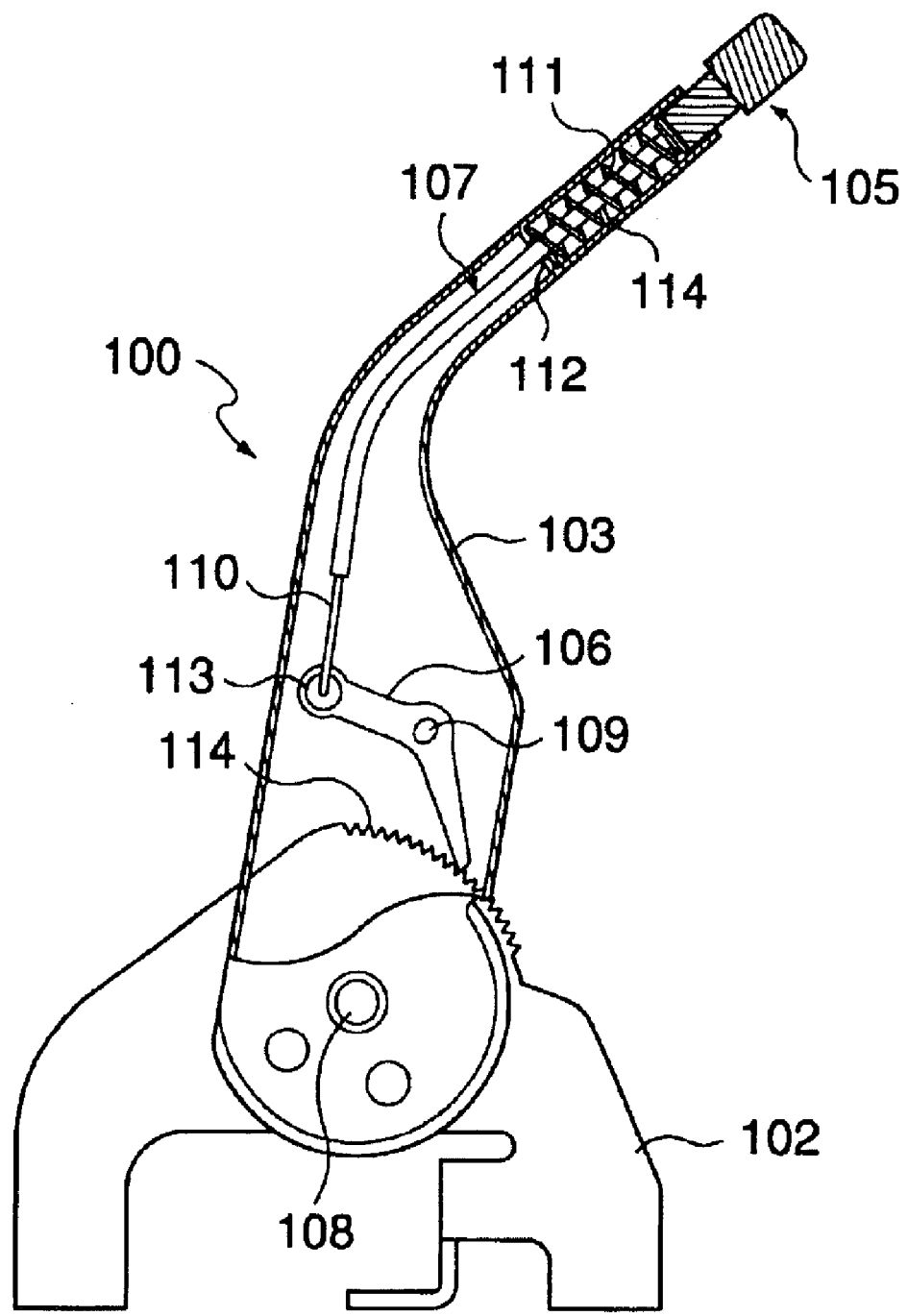
FIG. 4 shows an internal construction of the parking brake lever according to another embodiment.

An alternative embodiment of a parking brake lever as shown in FIG. 4 is different from the lever shown in FIGS. 1 to 3b in that a flexible cable 110 is provided adjacent to pawl 106 and in that a rod 114 is provided adjacent to push button 105. The flexible cable 110 of this embodiment is the material having the same characteristic as defined in the above.

In this embodiment, once again, only pressing push button 105 cannot release the braked state since pawl 106 does not rotate due to the force applied as shown in FIG. 3a. In order to release the braking state, an operator should pull oscillating member 103 upwardly as described in the above, and thereafter press push button 105.

Figure 5:
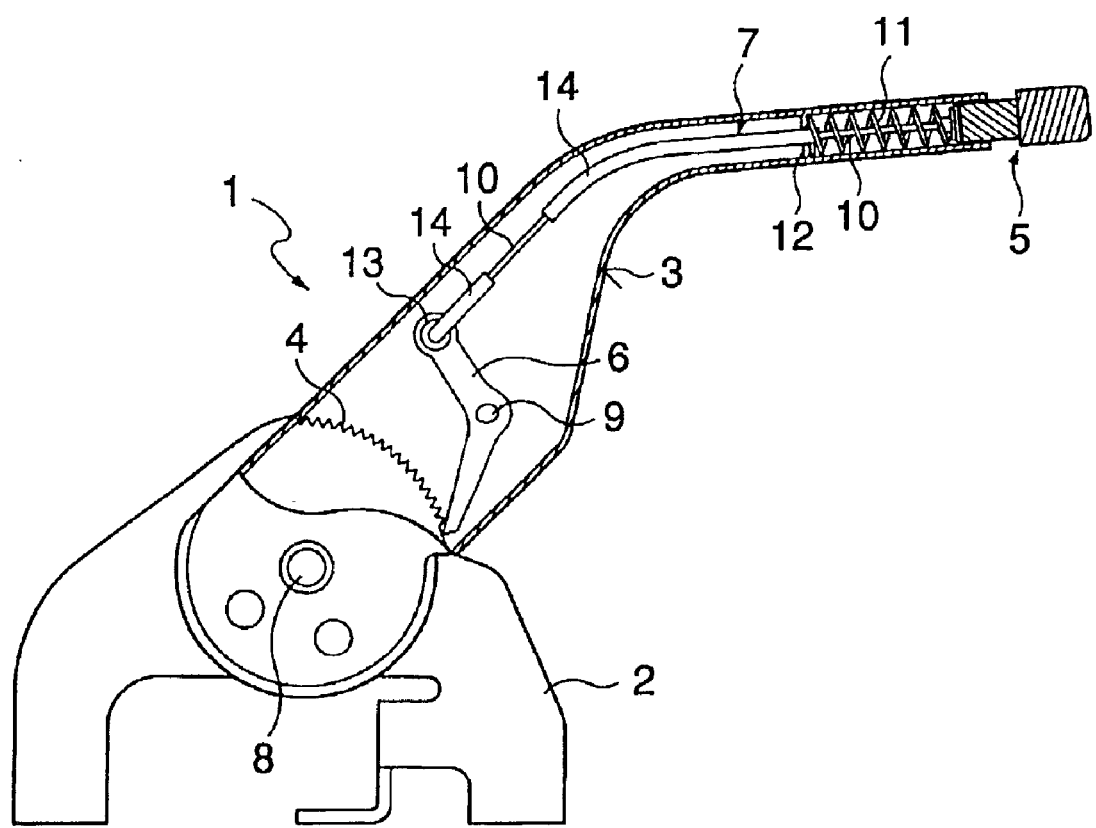
FIG. 5 shows a further preferred embodiment of the invention.

In another alternative embodiment, multiple flexible cables 10 may be employed. For example, as shown in FIG. 5, flexible cables 10 are installed before and after rod 14.

Thus, according to a parking brake lever of the present invention, even if the push button is inadvertently pressed, the parking brake lever cannot be in the releasable condition unless the oscillating member is slightly pulled upwardly. Thus, accident probability caused from inadvertent release of a parking brake is reduced.

Although it is described in the above that the flexible cable is provided adjacent to the push button or the pawl, the cable may be provided in any position of the connecting member. Further, it is possible to provide a plurality of flexible cables in the connecting member.

The invention will now be described based on the preferred embodiments, which do not intend to limit the scope of the present invention, but exemplify the invention. All of the features and the combinations thereof described in the embodiment are not necessarily essential to the invention.

Although the present invention has been described by way of exemplary embodiments, it should be understood that those skilled in the art might make many changes and substitutions without departing from the spirit and the scope of the present invention which is defined only by the appended claims.

What is claimed is:

1. A parking brake lever of a vehicle, comprising:

a supporting member adapted to be fixed to a frame of the vehicle and provided with a ratchet portion;

an oscillating member mounted on the supporting member and oscillatable between a braked position and a released position;

a push button provided in one end of said oscillating member;

a pawl being rotatable with respect to said oscillating member and engagable with said ratchet portion while said oscillating member is in the braked position, thereby preventing said oscillating member from oscillating to the released position; and a connecting member extending between said push button and said pawl and transmitting a pressing force from said push button to rotating force of said pawl, wherein at least a portion of said connecting member includes a flexible cable;

wherein said flexible cable has a characteristic of a material that can transmit the pressing force of the push button to the pawl so as to rotate the pawl when the oscillating member is slightly pulled upward from its braking position and that cannot transmit the pressing force of the push button to the pawl when the oscillating member is not pulled upward from the braking position.

2. The parking brake lever of claim 1, wherein said connecting member except the flexible cable comprises a substantially rigid rod.

3. The parking brake lever of claim 1, wherein a plurality of said flexible cables are provided.

4. The parking brake lever of claim 1, wherein said oscillating member is provided with a protrusion protruding within the oscillating member and, further comprising a resilient member whose one end is fixed in said push button and the other end engages with said protrusion.

5. A parking brake lever, comprising:

an oscillating member for actuating a braking system, said member moveable between a released position, a braked position and a releasable position; and a locking and releasing mechanism cooperating with said oscillating member such that said oscillating member may be locked in the braked position and released after movement to the releasable position, said mechanism including a deflectable element configured and dimensioned to absorb forces applied to said mechanism in the braked position thereby preventing release directly from the braked position;

wherein said locking and releasing mechanism comprises;

a ratchet portion adapted to be secured to a frame of a vehicle;

a pawl pivotably mounted on the oscillating member and engageable with said ratchet portion to lock the oscillating member in the braked position;

a release member mounted on the oscillating member in a driver-accessible location; and a linkage operatively connecting said release member and said pawl for transmitting a releasing force from said release member to said pawl, said linkage including said deflectable element; and wherein said deflectable element is disposed between said release member and said pawl in said linkage.

6. The parking brake lever of claim 5, wherein said release member comprises a push button disposed at an end of said oscillating member.

* * * * *